Sept. 15, 1970  C. E. WARN  3,528,224
AIR-CONDITIONING APPARATUS
Filed Dec. 27, 1967  3 Sheets-Sheet 1

INVENTOR.
CHARLES E. WARN
BY
Sidney Magnes
AGENT

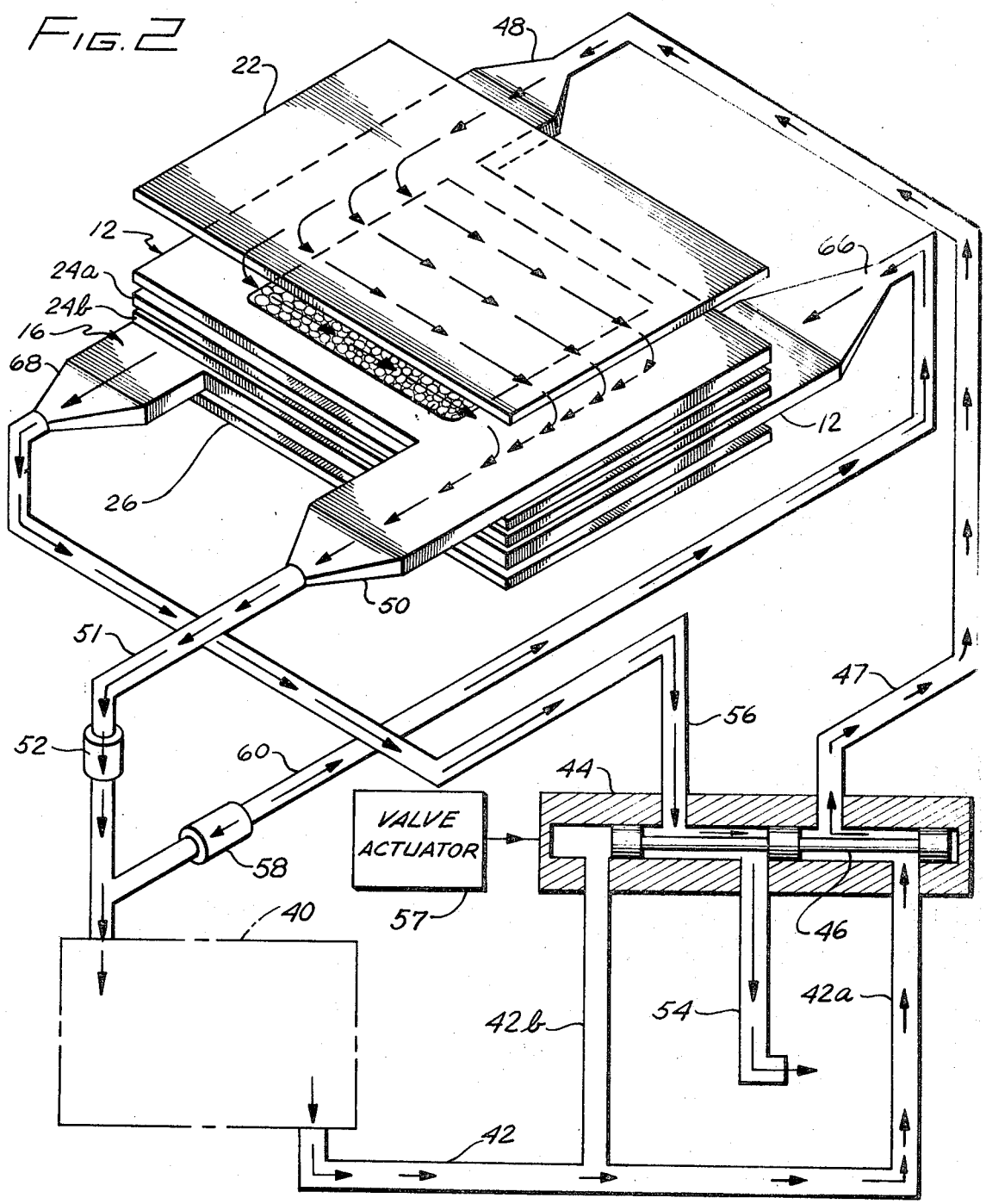

Sept. 15, 1970 C. E. WARN 3,528,224
AIR-CONDITIONING APPARATUS
Filed Dec. 27, 1967 3 Sheets-Sheet 3

INVENTOR.
CHARLES E. WARN
BY
Sidney Magnes
AGENT

United States Patent Office 3,528,224
Patented Sept. 15, 1970

3,528,224
AIR-CONDITIONING APPARATUS
Charles E. Warn, La Palma, Calif., assignor to North American Rockwell Corporation, El Segundo, Calif., a corporation of Delaware
Filed Dec. 27, 1967, Ser. No. 693,869
Int. Cl. B01d 53/00
U.S. Cl. 55—179                                                     7 Claims

ABSTRACT OF THE DISCLOSURE

This disclosure relates to an air-conditioning system using molecular-sieves that have the ability to "adsorb" selected elements, and to then "desorb" the previously adsorbed elements. The disclosed arrangement uses the heating-effect of the adsorbing-state molecular-sieve to warm the desorbing-state molecular-sieve; and uses the cooling-effect of the desorbing-state molecular-sieve to cool the adsorbing-state molecular-sieve. Thus, the overall structure acts as a substantially-constant temperature heat-sink that encourages each sieve-operation to occur at or near optimum temperature, without external cooling and heating apparatus. This molecular-sieve arrangement combines several environmental functions: (1) removal of water; (2) removal of carbon dioxide; (3) removal of contaminants, such as odor-producing compositions; and (4) rejection of latent heat of water.

BACKGROUND

The apparent ease of the first astronaut's space walk caused many workers in the field to underestimate the problem of having an astronaut perform space work while in his space-suit. It was therefore an extreme disappointment to find that in subsequent attempts to accomplish space work, the astronauts became extremely fatigued; and that perspiration fogged up their face-plates to the point where it interfered with the accomplishment of their assignments.

A closer examination of the working-in-space problem led to the realization that a tremendous amount of heat and perspiration was generated in the space-suit, with unexpected rates of 4000 B.t.u. per hour under peak working conditions.

Removal of this amount of heat imposes an appreciable load for an air-conditioning system, which should also remove perspiration-moisture and carbon dioxide from the sullied air coming from the astronaut's space-suit. The heat-removal load to be handled by the air-conditioning system can be broken down into two categories: sensible heat, and latent heat. The sensible heat, being the heating effect that occurs when the cooling gas flows over a heated object—such as the astronaut's body—is removed by cooling the warmed gas; and the latent heat, being the heating effect produced when moisture condenses, is best handled by removing the moisture.

Once this heat-removal problem was fully realized, many designs were suggested for solving it; but most of the proposed designs required cooling coils, motors, boilers or sublimators, water-reservoirs, and involved valving arrangements; this combination being heavy, complex, and voluminous.

OBJECTS AND DRAWINGS

It is therefore the principal object of the present invention to provide an improved air-conditioning system.

Figure 1:
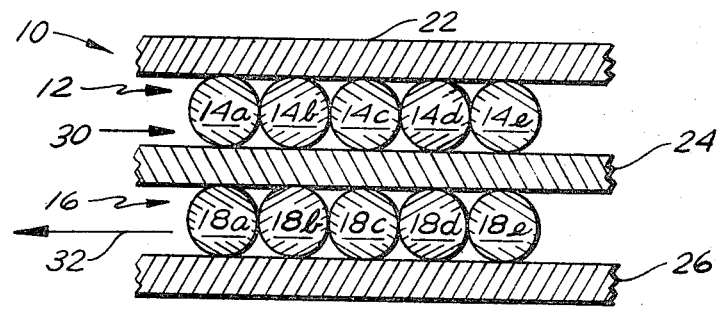
Figure 3:
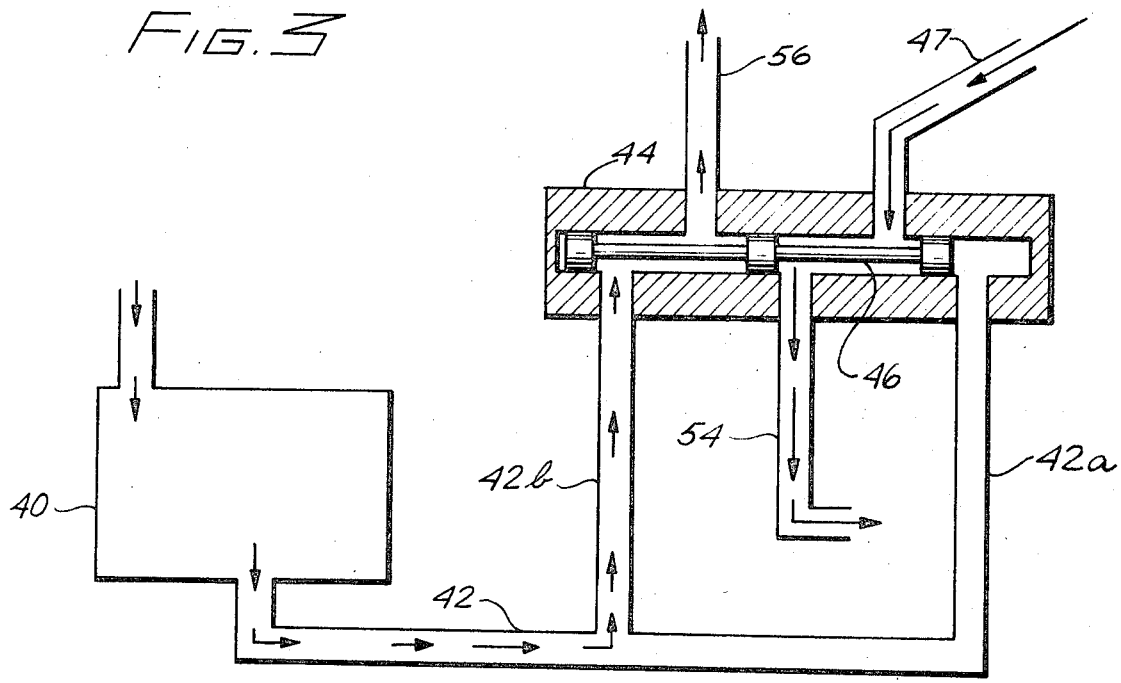
Figure 4:
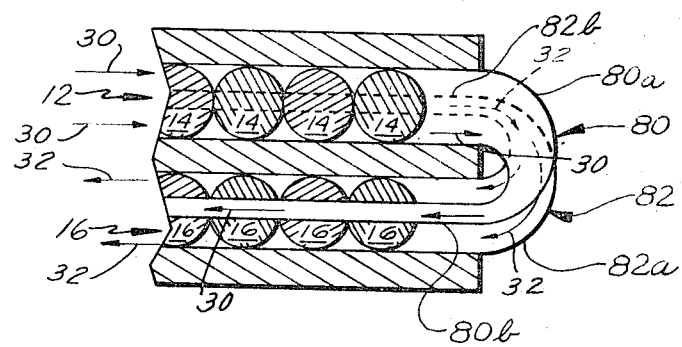
Figure 5:
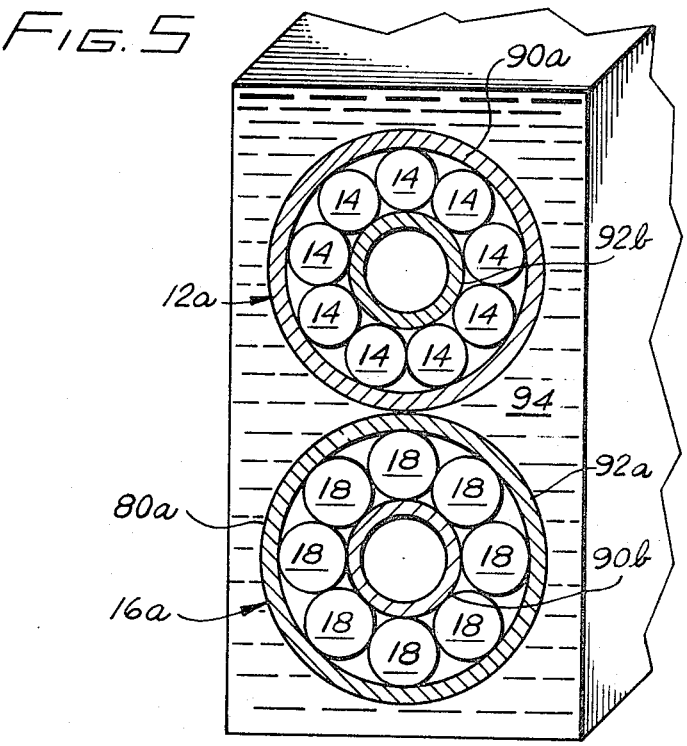

The obtainment of this object and others will be realized from the following detailed description, taken in conjunction with the drawings of which:

FIG. 1 shows the basic arrangement of the molecular-sieve air-conditioner;

FIG. 2 shows an overall system;
FIG. 3 shows the valve of FIG. 2 in a reversed state;
FIG. 4 shows a second embodiment; and
FIG. 5 shows still another embodiment.

SYNOPSIS

Broadly speaking, the present application discloses an air-conditioning system comprising a plurality of "molecular-sieves." It is known that a molecular-sieve becomes warm during its fluid-purifying "adsorption" state—the increased temperature degrading the adsorbing operation. It is also known that a molecular-sieve becomes cooled during the sieve's "desorption" state—the lowered temperature degrading the desorption operation. Thus, the ordinary operation of a molecular-sieve is such that it inherently tends to impair its own operation; and prior-art attempts to improve its operational efficiency have added heaters and coolers that have attempted to restore the molecular-sieves' original operational efficiency. Unfortunately, the additional complexity of external accessories has discouraged the use of molecular-sieves for an air-conditioning system.

The disclosed structure overcomes the inherent degradation of operational efficiency, and the need for external accessories, by the use of a structure that transmits heat from the heated adsorption-state sieve to the cooled desorption-state sieve, thus cooling the warmed molecular-sieve, and warming the cooled molecular-sieve to improve each of the operations. Various disclosed embodiments show how the purified fluid may have its temperature controlled, and how a complete operational system achieves the desired purpose.

INTRODUCTION

There is presently available a class of devices known as "molecular-sieves"; these acting as sieves in the sense that they entrap certain materials, and permit only selected materials to pass through them. Whereas the action of these devices resembles that of a sieve, their mode of operation is quite different, and is more fully described in the publication entitled "Linde Molecular Sieves" available from Union Carbide of New York City.

The molecular-sieves' operation is quite complex, and is not completely understoood; but, briefly stated, depends upon the ability of their constituent material ("adsorbent") to entrap, or "adsorb," certain materials (adsorbates) with which they are in contact—and to later "desorb" these adsorbates. The adsorption action is quite selective, depending upon various parameters such as the adsorbent's crystalline structure, pore size, physical form, temperature, etc.; so that the molecular-sieve can show a primary affinity for a first material (say moisture) and a secondary affinity for another material (say carbon dioxide), or may show selected or equal affinities for a plurality of adsorbates.

In the adsorption state of molecular-sieve, given adsorbates will adhere to the adsorbents that form the molecular-sieves; the adsorption-state operating best at low-temperature, and generating heat—the heat generation being known as an "exothermic" operation that provides the molecular-sieve with increased heat energy. Conversely, in the desorption state of the molecular-sieve, the previously-adsorbed adsorbates are liberated from the adsorbents that form the molecular-sieve; the desorption-state (also known as "regeneration") operating best at a high temperature. Regeneration (the desorption state) may be achieved in three ways; one being to heat the adsorbent, a second being to evacuate the volume surrounding the adsorbent, and the third being to pass a fluid—low in the adsorbed adsorbates—over the adsorbents. These regenerative conditions cause the previously-adsorbed adsorbates to leave the adsorbents in the form of "desorption-products." In either case, the desorption process cools the adsorbent, and is known as an "endothermic" operation that leaves the molecular-sieve with decreased heat energy.

To recapitulate, adsorption operates best at a low temperature; but produces heat that raises the temperature, and thus degrades the adsorption operation. On the other hand, desorption operates best at a high temperature; but becomes cooled, lowers the temperature, and thus degrades the desorption operation. Therefore, prior-art molecular-sieve devices needed external heating and cooling equipment for operation.

DETAILED DESCRIPTION

The present invention overcomes the prior-art problems in a manner that may be understood from FIG. 1, which is a longitudinal cross-sectional view. Here an arrangement 10 comprises a first molecular-sieve 12 having a plurality of adsorbents 14a, 14b, 14c, etc., and a second substantially identical molecular-sieve 16 having a plurality of adsorbents 18a, 18b, 18c, etc. Molecular-sieve materials are more particularly described in U.S. Pats. 2,882,243; 2,882,244; and 2,973,327.

The two molecular-sieves 12 and 16 are sandwiched between a top-plate 22, an intermediate-plate 24, and a bottom-plate 26; the plates being of a heat-conducting material—and the various adsorbents 14 and 18 being in thermal contact with their adjacent plates. (Whereas the molecular-sieves may take the form of powder, pellets, blocks, etc., ball-shaped adsorbents are preferred for optimal thermal-contact considerations.)

Directing attention to molecular-sieve 12 of FIG. 1, a "sullied" fluid—such as a person's exhalations containing moisture and carbon-dioxide—is first passed over molecular-sieve 12 in the direction of arrow 30. As discussed above, certain molecular-sieves have characteristics of adsorbing moisture, odor-producing compositions, etc.; so the number of balls 14 necessary for the operation of molecular-sieve 12 will depend primarily upon the flow rate and content of the sullied fluid. In this way, a sullied fluid passes through a suitable molecular-sieve; is purified; and emerges as relatively unsullied fluid, with its pollutants removed.

As previously indicated, the adsorption operation produces heat; so that molecular-sieve 12 is warmed. Unfortunately however, as previously discussed, the adsorpsion operation is impaired when the molecular-sieve has its temperature raised; so that as molecular-sieve 12 becomes warmed, it tends to become progressively less efficient as its adsorption operation is prolonged; and eventually becomes saturated, for that temperature, with adsorbates.

Assume now, that the flow of sullied fluid through molecular-sieve 12 is terminated; and that one end, say the left-most end, of saturated molecular-sieve 12 is exposed to a vacuum—such as outer space. The moisture, carbon dioxide, etc. adhering to adsorbent balls 14, now tends to vaporize, forming desorption-products that flow from molecular-sieve 12 to—in the case of outer-space vacuum—outer space. The desorption process thus tends to clean-up, or regenerate, molecular-sieve 12; so that it may be used again for an adsorption operation.

Unfortunately, as discussed above, the desorption operation cools the molecular-sieve, and the resultant lower temperature degrades the desorption process—so that eventually an incomplete-regenerated state is reached.

BASIC OPERATION

The disclosed invention overcomes the above problems in the following manner. At first, by means to be discussed later, sullied air is passed through molecular-sieve 12 in the direction indicated by arrow 30, so that adsorption takes place in molecular-sieve 12; and molecular-sieve 12 becomes warm. Simultaneously, in a manner to be discussed later, molecular-sieve 16 is exposed to a vacuum, so that it is in a desorption state, and becomes cooled; its desorption-products flowing in the direction of arrow 32. Since molecular-sieves 12 and 16 are both in thermal contact with thermally-conductive intermediate-plate 24, heat tends to flow from the warmed adsorption-state molecular-sieve 12 through the thermally-conductive intermediate-plate 24 to the cooled desorption-state molecular-sieve 16. As a result of the heat flow, the warmed molecular-sieve 12 is cooled, thus increasing its operational efficiency; and the cooled desorption-state molecular-sieve 16 is heated, thus increasing its operational efficiency.

Thus, the disclosed arrangement increases the operational efficiency of each molecular-sieve by causing it to approach a more optimum temperature for its operation.

It will be realized that after a given interval of time, molecular-sieve 12 will become saturated with adsorbates; and molecular-sieve 16 will be desorbed; at which time the above processes will be terminated. At or before this time arrives however, by means to be discussed later, the sullied air flow is diverted to pass through the desorbed molecular-sieve, 16, so that molecular-sieve 16 now assumes its adsorption state; and becomes warmed. Simultaneously, by means to be discussed later, molecular-sieve 12 is now converted to a desorption state, whereupon it becomes cooled. Now, the heat transfer is in the opposite direction; namely from the warmed adsorption-state molecular-sieve 16 to the cooled desorption-state molecular-sieve 12. Again, the flow of heat is such as to cause each sieve to approach a more optimum temperature for its instantaneous mode of operation.

As the above-described reversal is cyclically repeated, intermediate plate 24 eventually assumes a substantially-constant temperature; and to enhance this effect, top-plate 22, intermediate-plate 24, and bottom-plate 26 are thermally and mechanically interconnected to form a substantially constant-temperature heat-sink that enhances the above-described operation by means of a passive thermodynamic device.

In this way, cyclic reversal of the flow-direction of the sullied fluid and the desorption-products, and the described heat-flow structure, permits the disclosed device to act as an improved air-conditioner and purifier and obviates the need for external heating and cooling accessories.

The flow-direction of the sullied fluid and desorption-products will now be discussed, as this can be advantageously used to improve the operational efficiency. Assume that—see FIG. 1—in the initial condition, the sullied air is flowing as indicated by arrow 30; and that the desorption products flow is in the opposite direction, as indicated by arrow 32. Directing attention to the adsorption-state molecular-sieve 12, it will be understood that the first ball 14a will first become saturated with moisture; that the second ball 14b will next become saturated with moisture; and that this process is continued. Thus, sullied air—flowing in the direction indicated by arrow 30—will cause balls 14 to become warmed in the 14a, 14b, 14c, 14d, .... sequence.

Simultaneously, ball 18a of molecular-sieve 16 will be the first to begin to desorb, as it is closest to the vacuum; and desorption products will flow in the direction indicated by arrow 32. As ball 18a is partially desorbed, adjacent ball 18b begins to desorb; the additional desorption products also flowing in the direction of arrow 32. Because of this progressive action, balls 18 are cooled in the 18a, 18b, 18c, 18d, ... sequence.

Thus, ball 14a of adsorbing-state molecular-sieve 12 is the first to become warmed, and ball 18a of desorbing state molecular-sieve 16 is the first to become cooled; so, preferably, balls 14a and 18a are opposite each other—in order for heat to be transferred earliest and fastest between these extreme-temperature portions of the molecular-sieves 12 and 16.

As discussed above, progressive adsorption at molecular-sieve 12 progressively warms balls 14a, 14b, 14c, etc.; and progressive desorption at molecular-sieve 16 progressively cools balls 18a, 18b, 18c, etc. Therefore, as portions of the adsorbing-state molecular-sieve 12 become warmed, correponding portions of desorbing-state molecular-sieve 16 become cooled, thus enhancing heat flow between corresponding portions of the molecular-sieves. Therefore, counter-flow of the sullied fluid and the desorption-products, as indicated by opposite-sense arrows 30 and 32, is preferred for optimal efficiency.

It will be recalled from the above discussion that molecular-sieve 12 at one time assumes an adsorption-state, and subsequently assumes a desorption state; that the flow-direction of sullied fluid and desorption products causes ball 14a to be the first to absorb moisture, and the first to desorb moisture; that ball 14b is the second to adsorb moisture, and the second to desorb moisture; etc. Thus, there will tend to be a so-called "liquid-line," which may be defined as being the dividing line between the ball that contains adsorbed-moisture and the ball that has desorbed its moisture; this liquid-line tending to move back and forth during the adsorption and desorption operations. Of course, there will be a corresponding "gas-line" for carbon dioxide, etc.

It will of course be realized that in the longitudinal cross-sectional view of FIG. 1, the bed-length (14a, 14b, 14c, . . .; 18a, 18b, 18c, . . .) may be extended for the length desired. Similarly, the individual balls (14a, 14b, 14c, . . .; 18a, 18b, 18c, . . .) represent a plurality of balls extending into and out of the plane of the drawing. While for purposes of explanation, orderly lines and rows of balls were implied, this is ordinarily not essential; the primary requirement being that the balls be in good thermal contact with the passive heat-conducting structure. Thus, in view of this discussion, the previously-discussed liquid-line tends to be a straight line that extends across the width of the molecular-screen; and tends to maintain its straight-line characteristic as it moves back and forth.

In prior-art molecular-sieve concepts, for a four-hour mission the bed length of adsorbents was made long enough so that the liquid-line advanced to the distal end of the bed at the end of a given time-interval, say one hour; whereupon another molecular-sieve was put into operation. Since desorption required external heating equipment, it was generally omitted; and thus four or more molecular-sieves were necessary. If desorption was performed enroute, at least two molecular-sieves were necessary. These processes were performed at low operational efficiencies, or at the expense of high-powered heating and cooling equipment.

In the present case, the operational efficiencies are quite high; and a fast-cycling sequence having a duration of about thirty to forty-five seconds is used. The fast-cycling concept permits the use of a short bed-length, with resultant reduced weight and volume; and eliminates the need for high-powered heating and cooling equipment.

Referring now to FIG. 2, there is illustrated—in exploded form—an apparatus for achieving the desired results. It may be seen that the illustrated apparatus comprises a top-plate 22, a first molecular-sieve 12, and a first intermediate-plate 24a, a second intermediate-plate 24b, a second molecular-sieve 16, and a bottom-plate 26; the combinations 22–12–24a and 24b–16–26 forming modules that coact as previously described.

Molecular-sieves 12 and 16 are illustrated as relatively-flat plenum chambers through which a fluid may flow. The central portion of the plenum chamber has been removed to accommodate a plurality of molecular-sieve balls that are held in place by screening, or—as indicated—by thermally conductive plates 22–24a and 24b–26. Alternative structures may of course be used.

In order to air-condition the air from a unit, such as a space-suit 40, the sullied air from that unit is discharged by conventional pressure operating means (not illustrated) to produce a fluid flow—indicated by the short arrows—through an exit-tube 42 to a reversible valve arrangement 44. The valve has a compound piston 46 that—in its right-most state illustrated—directs the sullied air from exit-tube 42 and 42a through suitable tubing 47 to a first manifold 48 of molecular-sieve 12. As discussed previously, the sullied air flows through molecular-sieve 12—which is in its adsorption state. During the passage of the sullied air through molecular-sieve 12, the air is purified as previously discussed; and the purified air now flows out of manifold 50, through suitable tubing 51 and check-valve 52, back to space-suit 40. Check valve 52 is poled so as to permit only the flow of purified air into space-suit 40; the further operation of check-valve 52 being described subsequently.

Simultaneously with the above adsorption operation of molecular-sieve 12, a desorption operation is occurring in molecular-sieve 16; this being achieved in the following manner. Exhaust tube 54 is open to a vacuum, such as that of outer space; and the right-most illustrated position of reversible valve 44 causes the vacuum to be applied—as indicated by the long arrows—through reversible-valve 44 to tubing 56 and manifold 68, with the following results.

The adsorbates adhering to molecular-sieve 16 are now exposed to, and discharged to, the vacuum of outer space; the vaporized adsorbates forming the desorption-products flow that is exhausted through exhaust tube 54 to outer space. Check valve 58—which is connected with manifold 66 at the other end of molecular-sieve 16—is poled to automatically close; blocking tube 60 so that there is no fluid flow from space-suit 40 through molecular-sieve 16. Molecular-sieve 16 thus assumes its desorption state. The previously described heat flow now takes place through plates 22, 24, and 26; and provides high operational efficiency.

After a given time-interval, reversible valve 44 is re-positioned by moving its compound piston to the left—as indicated in FIG. 3. Under this condition, molecular-sieve 12 is now in its desorption state, and molecular-sieve 16 is now in its adsorption state. Specifically, referring to FIG. 3, it will be seen that the sullied-gas from suit 40 now flows—as indicated by the short arrows—through exit tubes 42 and 42b, through valve 44, and into tubing 56. Referring now to FIG. 2, the sullied-gas now flows from tubing 56, into manifold 68, through molecular-sieve 16, out of manifold 66, and through check-valve 58 to suit 40. Thus, as explained above, the sullied-air now flows through regenerated, or desorbed, molecular-sieve 16—which thereupon now assumes its adsorption state; and purifies the sullied gas flowing therethrough. In this manner, either position of valve 44 purifies the sullied air from the space-suit 40; and provides the suit with purified gas.

The reversal of valve 44 accomplishes another result, namely the regeneration of the saturated molecular-sieve 12; this being achieved as follows. Referring again to FIG. 3, it will be seen that the reversed location of piston 46 connects tubing 47 to the exhaust tube 54, and thus to the vacuum of outer space. As a result of this reversed-valve condition, FIG. 2 shows that the vacuum is applied to tubing 47, manifold 48, molecular-sieve 12, manifold 50, tubing 51 and check-valve 52. Since check-valve 52 is polarized to prevent fluid flow in this direction, no fluid from suit 40 enters the evacuated system; and the previously absorbed adsorbates now form desorption-products that flow into outer space. Thus, reversal of valve 44, causes the previously saturated molecular-sieve to be regenerated.

In this way, each molecular-sieve alternately assumes its adsorption and desorption state; and in each state the heat transmission through the various plates assures a substantially-constant-temperature heat-sink operation for the unit, as previously described. The short-interval fast-cycling effect is readily obtained by causing reversible valve arrangement 44 to be rapidly reversed by any suitable well-known electrical or mechanical actuator 57.

Whereas FIG. 2 illustrates and explains the operation in terms of two molecular-sieves 12 and 16, it is recognized that increased gas-handling properties may be achieved by using a plurality of molecular-sieves. Thus, molecular-sieve 12 may be replaced by a group or plurality of layers of molecular-sieves, and the same may be done with respect to molecular-sieve 16. It is only necessary that they be in good thermal contact with a heat-transferring element; and developments indicate an array comprising an alternating interleaved arrangement with intermediate heat-conducting elements. Sutiable plumbing, ducting, and manifolding provide the above described sequential operations.

It will be realized that each reversal of valve 44 discharges a volume of moisture, oxygen, carbon dioxide, and other pollutants to outer space. The oxygen loss is minimal—due to the low three-and-one-half pounds per square inch space suit pressure, the compactness of the molecular-sieves, and the placement of the check-valves.

An examination of FIG. 2 will indicate that for the illustrated valve condition, the sullied-fluid flow through molecular-sieve 12 is from the upper-left to the lower-right during the adsorbing-state; whereas the desorption-products flow through molecular-sieve 16 is from the lower-right to the upper-left. During the reversed portion of the cycle, the flows are in their opposite directions; in both cases providing the preferred counter-flow condition.

If some other flow pattern is desired, either or both of the molecular-sieves may be turned relative to the other; or, alternatively, the manifolds may be repositioned in such a way that the desired flow pattern is achieved. If enhanced air-conditioning is desired, a multiple-layer molecular-sieve structure may be used; so that larger volumes of fluids may be handled. Thus the disclosed arrangement provides an air-conditioning system wherein relatively-small molecular-sieves each tend to operate at the temperature that is optimum for its instantaneous mode of operation; and this result is achieved without the use of boilers, cooling coils, or the like.

OTHER EMBODIMENTS

It was previously pointed out that a sullied fluid is purified during the adsorption-state of the molecular-sieve; the sieve producing a warming effect. Despite the fact that much of the heat is transmitted, by the thermally-conductive structure, to the cooled desorption-state molecular-sieve, the purified fluid tends to be warmed as it passes through the warmed adsorption-state sieve. FIG. 4 shows an embodiment wherein the warm purified fluid may be passed through the cooled desorption-state molecular-sieve, so that it emerges as a cooled purified fluid.

In FIG. 4, the warmed purified air emerging from the right-most end of molecular-sieve 12 is directed into a U-shaped duct 80; duct 80 having a large cross-sectional portion 80a that gradually decreases to a small cross sectional portion 80b. As illustrated, the small cross-section portion 80b pierces the balls of molecular-sieve 16. In this way, the warmed purified fluid emerging from the adsorption-state molecular-sieve 12 is collected by duct 80, and is passed through the cooled balls of the desorption-state molecular-sieve 16; so that the emergent fluid is cooled. Furthermore, the warm fluid additionally heats the adsorbents of molecular-sieve 16, to aid in providing the desorption-state molecular-sieve with the higher temperature that is optimum for the desorbing operation.

It will be noted that FIG. 4 also shows another corresponding U-shaped duct 82 having a large cross-sectional portion 82a and a small cross-sectional portion piercing the balls of molecular-sieve 12. In this case, no desorption-products are formed in small cross-sectional portion 82b, since this volume is not in contact with the absorbent balls; but these products are formed at the surface adsorbent balls of molecular-sieve 16, and flow in the direction of arrow 32—as discussed above. Thus, the desorption-products never mingle with the sullied or the purified fluid.

On the alternate portion of the cycle, when molecular-sieve 16 acts as the adsorption-state sieve, its warmed emerging fluid is directed—by small cross-sectional duct portion 82b—through the balls of now cooled desorption-state molecular sieve 12; so that these cooled balls now cool the fluid flowing through the desorption-state sieve. Thus, regardless of the instantaneous state of the air-conditioning cycle, the purified fluid is additionally cooled; and the desorption-state molecular-sieve is additionally warmed to obtain the optimum temperature for its desorption operation.

FIG. 5 shows another arrangement for purifying and cooling a sullied fluid. In this embodiment, each molecular-sieve 12a and 16a assumes a concentric—rather than a planar—configuration, but operates in the same manner as those previously described in connection with FIG. 4; each molecular-sieve having corresponding U-shaped ducts (not shown) for cooling the purified fluid in a non-mingling manner. For example, the cross-sectional view of FIG. 5 shows that molecular-sieve 12a comprises a plurality of annularly-positioned ball-shaped adsorbents 14 positioned between an outer tube 90a and an inner tube 92b. Similarly, molecular-sieve 16a also comprises a plurality of annularly-positioned ball-shaped adsorbents 18 positioned between an outer tube 92a and an inner tube 90b. (Tubes 90a, 90b and 92a, 92b of FIG. 5 have the same relationship as tubes 80a, 80b and 82a, 82b of FIG. 4.)

In FIG. 5, the sullied air is first directed to molecular-sieve 12a, through the annular space between outer tube 90a and inner tube 92b containing the ball-shaped adsorbents 14; thus causing molecular-sieve 12a to assume an adsorption state, and to be warmed. Plumbing 90, as previously discussed, causes the purified emergent air from sieve 12a to be returned through the centermost tube 90b of the second molecular-sieve, 16a.

Simultaneously, the desorption-products from desorption-state molecular-sieve 16a are passed from the annular space of sieve 16a to a vacuum, as previously described; suitable plumbing 92, causing a check-valve to close the small-diameter portion 92b passing through the center of the adsorption state molecular-sieve 12a.

In this arrangement tubes 90 and 92 act as thermally-conductive top-plate, intermediate-plate, and bottom-plate that conduct heat from the warmed adsorption-state molecular-sieve to the cooled desorption-state molecular-sieve. To enhance this thermal conduction and the substantially-constant temperature heat-sink feature, the molecular-sieves 12a and 12b may be submerged in a thermally-conductive bath—which may comprise a cooling solution 94 such as water—for transmitting heat between the various tubes. In this way, the molecular-sieves are warmed and cooled to help obtain the most desirable operating temperature for their operation; and the purified fluid is also cooled.

During the next time interval, the flow of sullied fluid and desorption products is reversed, as described.

Whereas the disclosed air-conditioning system has been described in terms of use with an astronaut's space-suit, it is obviously useful in other locations, such as homes, vehicles, and the like. For example, in a vehicle, the entire vehicle-body may be used as the heat-sink; and regeneration may be produced by either waste heat from the engine, or by means of a pump that causes the flow of desorption products.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:

1. An air-conditioning arrangement comprising in combination:
   a thermally-conductive top-plate;
   a first molecular-sieve, capable of assuming adsorption and desorption states, having its upper surface in thermal-conduction contact with the lower surface of said top-plate, said molecular-sieve having a pair of manifolds, either of which may be the inlet, whereupon the other becomes the outlet, said molecular-sieve characterized by an ability to preferentially adsorb moisture, and to secondarily adsorb carbon dioxide, said molecular-sieve also being characterized by a heating effect during adsorption and by a cooling effect during desorption;
   a thermally-conductive intermediate-plate having its upper surface in thermal-conductive contact with the lower surface of said first molecular-sieve;
   a secondary substantially identical molecular-sieve having its upper surface in thermal-conduction contact with the lower surface of said intermediate-plate;
   a thermally conductive bottom-plate having its upper surface in thermal conductive contact with the lower surface of said second molecular-sieve;
   means for thermally interconnecting said top, intermediate, and bottom plates to define a plate-structure;
   valve means for directing sullied air, containing moisture and carbon dioxide, to flow in a given direction through the manifolds of said first molecular-sieve, for causing said first molecular-sieve to act in an adsorption manner, and to become warmed;
   valve means for directing desorption-products to flow in a given direction through the manifolds of said second molecular-sieve for causing said second molecular-sieve to act in a desorption manner, and to become cooled;
   said valve means being reversible for diverting the flow of said sullied air from the manifold of said first molecular-sieve to the manifold of said second molecular-sieve for causing said second molecular-sieve to now act in an adsorption manner and to become warmed, and for diverting the flow of desorption-products from the manifold of said second molecular-sieve to the manifold of said first molecular-sieve for causing said first molecular-sieve to now act in a desorbing manner, and to become cooled; and
   whereby heat is always transmitted through said thermally-interconnected plate-structure from said warmed adsorbing molecular-sieve to said cooled desorbing molecular-sieve, said plate-structure acting as a substantially-constant-temperature heat-sink.

2. The combination of claim 1 including means for blocking the inlet manifold of the molecular-sieve that is in its desorption state.

3. The combination of claim 2 including means for fast-cycling said valve means.

4. The combination of claim 1 including duct means for producing un-mingled flow from one molecular-sieve through said other molecular-sieve.

5. The combination of claim 1 including a pair of duct means for producing un-mingled flow from each molecular-sieve through the other molecular-sieve.

6. The combination comprising:
   a first molecular-sieve having a heat-conducting outer tube, a heat-conducting inner tube, and a plurality of adsorbents positioned in the annular space between said tubes, said adsorbents being in thermal contact with each said tube;
   a second similar molecular-sieve;
   said outer tube of each molecular-sieve being configurated to form the inner tube of said other molecular-sieve;
   whereby heat from either molecular-sieve is transmitted by said tubes to the other molecular-sieve.

7. The combination of claim 6 including means, comprising a thermally conductive bath, for transmitting heat between said various tubes.

References Cited

UNITED STATES PATENTS

| | | | |
|---|---|---|---|
| 3,160,486 | 12/1964 | Busch | 55—33 |
| 3,242,651 | 3/1966 | Arnoldi | 55—33 |
| 3,263,400 | 8/1966 | Hoke et al. | 55—33 |
| 3,338,034 | 8/1967 | Hemstreet | 55—389 |
| 3,355,860 | 12/1967 | Arnoldi | 55—33 |
| 3,323,288 | 6/1967 | Cheung et al. | 55—179 |

OTHER REFERENCES

Pall Trinity Technical Data Publication, "HX Automatic Dryer," 1963, pp. 55–62.

REUBEN FRIEDMAN, Primary Examiner

C. N. HART, Assistant Examiner

U.S. Cl. X.R.

55—208, 389